US010866689B2

(12) United States Patent
Hama et al.

(10) Patent No.: US 10,866,689 B2
(45) Date of Patent: Dec. 15, 2020

(54) INFORMATION PROCESSING APPARATUS, METHOD, AND PROGRAM FOR CONTROLLING A BACKGROUND OF A DISPLAY SCREEN

(71) Applicant: Sony Mobile Communications Inc., Tokyo (JP)

(72) Inventors: Tatsuya Hama, Tokyo (JP); Shoichiro Moriya, Malmö (SE); Takahiro Kawaguchi, San Mateo, CA (US)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/485,796

(22) PCT Filed: Dec. 19, 2017

(86) PCT No.: PCT/JP2017/045485
§ 371 (c)(1),
(2) Date: Aug. 14, 2019

(87) PCT Pub. No.: WO2018/154940
PCT Pub. Date: Aug. 30, 2018

(65) Prior Publication Data
US 2020/0050343 A1 Feb. 13, 2020

Related U.S. Application Data

(60) Provisional application No. 62/462,056, filed on Feb. 22, 2017.

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01); *G06F 3/04883* (2013.01)

(58) Field of Classification Search
CPC ............... G06F 3/04817; G06F 3/0482; G06F 3/04842; G06F 3/04883; G06F 3/0481;
(Continued)

(56) References Cited

U.S. PATENT DOCUMENTS 10,296,189 B2    5/2019  Amemiya et al.
2005/0197765 A1  9/2005  Kido et al.
(Continued)

FOREIGN PATENT DOCUMENTS

JP    10-187233 A     7/1998
JP    2005-217947 A   8/2005
(Continued)

OTHER PUBLICATIONS

International Search Report and Written Opinion dated Feb. 13, 2018 for PCT/JP2017/045485 filed on Dec. 19, 2017, 9 pages including English Translation of the International Search Report.
(Continued)

*Primary Examiner* — Ryan A Lubit
(74) *Attorney, Agent, or Firm* — Xsensus LLP

(57) ABSTRACT

To indirectly express a state change of an information processing apparatus.
An information processing apparatus includes a display control unit that generates a display screen including a background object, and the display control unit moves the background object in accordance with a state change of the information processing apparatus.

13 Claims, 13 Drawing Sheets

(51) Int. Cl.
*G06F 3/0484* (2013.01)
*G06F 3/0488* (2013.01)

(58) Field of Classification Search
CPC .... G06F 1/3265; G06F 1/3262; G06F 1/3215; G06F 1/1643; G06F 11/32; G06F 21/32
See application file for complete search history.

(56) References Cited

U.S. PATENT DOCUMENTS

| | | |
|---|---|---|
| 2010/0317408 A1 | 12/2010 | Ferren et al. |
| 2011/0016394 A1* | 1/2011 | Dukane ................ G06F 16/686 715/716 |
| 2014/0123013 A1 | 5/2014 | Lee et al. |
| 2015/0370444 A1 | 12/2015 | Jitkoff et al. |
| 2016/0224299 A1 | 8/2016 | Lim et al. |
| 2017/0285878 A1* | 10/2017 | VanBlon ............. G06F 3/04817 |
| 2017/0371515 A1* | 12/2017 | Feit ...................... G06F 3/0488 |
| 2019/0019048 A1* | 1/2019 | Deng ...................... G06F 21/32 |

FOREIGN PATENT DOCUMENTS

| | | |
|---|---|---|
| JP | 2005-225484 A | 8/2005 |
| JP | 2009-53506 A | 3/2009 |
| JP | 2011-141825 A | 7/2011 |
| JP | 2015-230560 A | 12/2015 |
| WO | 2016/208835 A1 | 12/2016 |

OTHER PUBLICATIONS

"Wanting to scroll a piece of wallpaper sideways (?) if inexpensive smartphone and inexpensive SIM [SIM communication]", URL:https://sim2.goo.ne.jp/article/post_148295, Dec. 14, 2014, 8 pages with English translation.

Extended Search Report issued in European Application 17898053.8-1221 dated Dec. 13, 2019.

* cited by examiner

INFORMATION PROCESSING APPARATUS, METHOD, AND PROGRAM FOR CONTROLLING A BACKGROUND OF A DISPLAY SCREEN

CROSS-REFERENCE TO RELATED APPLICATIONS

The present application is based on PCT filing PCT/JP2017/045485, filed Dec. 19, 2017, which claims priority to U.S. Provisional Application No. 62/462,056, filed Feb. 22, 2017, the entire contents of each are incorporated herein by reference.

TECHNICAL FIELD

The present disclosure relates to an information processing apparatus, method, and program.

BACKGROUND ART

In recent years, information processing apparatuses such as mobile phones and smartphones are widely used. A display screen of an information processing apparatus generally includes display that directly indicates a state of the information processing apparatus, such as a battery-shaped indicator indicating a remaining battery capacity and an antenna-shaped indicator indicating a radio wave reception environment. Display control in an information processing apparatus is disclosed, for example, in Patent Document 1.

CITATION LIST

Patent Document

Patent Document 1: Japanese Patent Application Laid-Open No. 2011-141825

SUMMARY OF THE INVENTION

Problems to be Solved by the Invention

In addition to or instead of display directly indicating a state of an information processing apparatus described above, it is desired that a display indirectly indicating a state of an information processing apparatus is performed.

Therefore, the present disclosure proposes a new and improved information processing apparatus, method, and program, capable of indirectly expressing a state change of an information processing apparatus.

Solutions to Problems

According to the present disclosure, there is provided an information processing apparatus which includes a display control unit that generates a display screen including a background object, and the display control unit moves the background object in accordance with a state change of the information processing apparatus.

Furthermore, according to the present disclosure, there is provided a method which is performed by an information processing apparatus, the method including generating a display screen including a background object by a processor and moving the background object according to a state change of the information processing apparatus.

Furthermore, according to the present disclosure, there is provided a program for causing a computer to function as an information processing apparatus including a display control unit for generating a display screen including a background object, the display control unit moving the background object in accordance with a state change of the information processing apparatus.

Effects of the Invention

As described above, according to the present disclosure, it is possible to indirectly express a state change of an information processing apparatus.

Note that, the above-described effect is not necessarily limited, and together with or in place of the above-described effect, any one of the effects described in the present specification or other effects that can be grasped from the present specification may be exerted.

MODE FOR CARRYING OUT THE INVENTION

Figure 1:
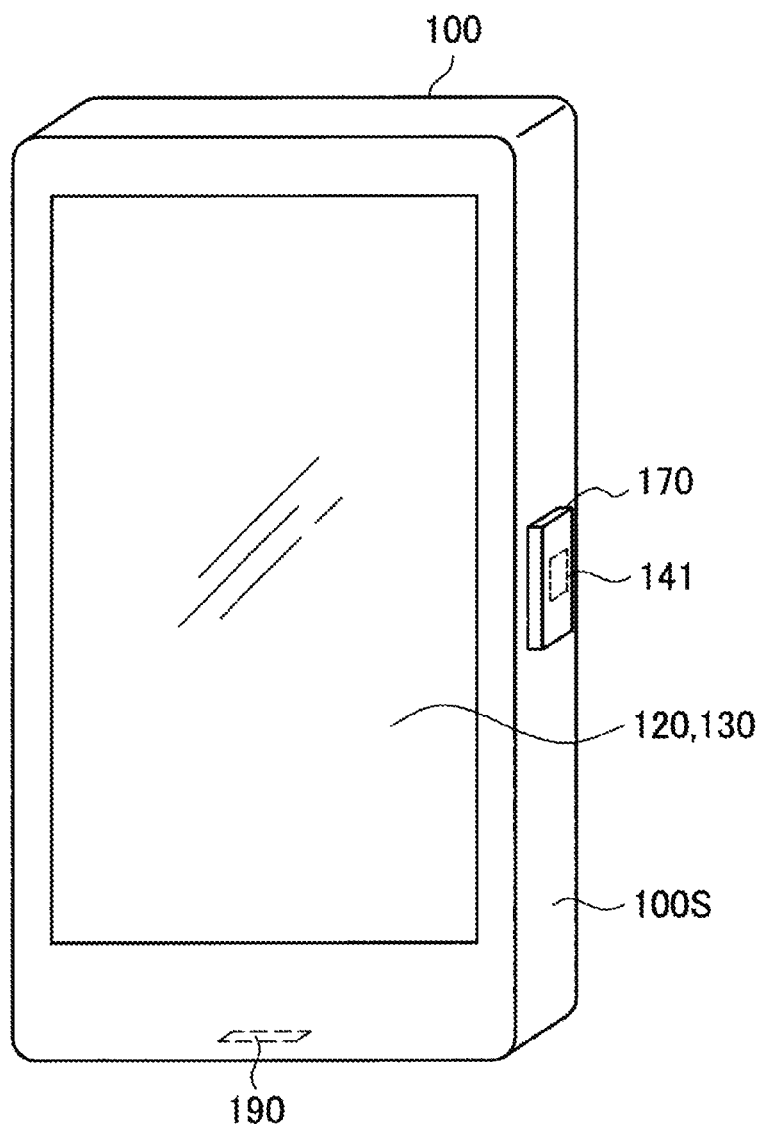
FIG. 1 is a view illustrating an appearance of a terminal device of the present disclosure.

A preferred embodiment of the present disclosure will be described in detail below with reference to the accompanying drawings. Note that, in the present specification and the drawings, the same reference numerals are given to components having substantially the same functional configuration, and redundant explanation will be omitted.

Furthermore, the present disclosure will be described in order below.
 1. Appearance Configuration of Terminal Device
 2. Function of Terminal Device
 3. Specific Example of Display Control
 4. Operation of Terminal Device
 5. Conclusion

1. APPEARANCE CONFIGURATION OF TERMINAL DEVICE

FIG. 1 is a view illustrating an appearance of a terminal device 100 of the present disclosure. As illustrated in FIG.

1, for example, the terminal device 100 may be a smartphone. In the terminal device 100, a display unit 120 and a touch panel 130 are disposed on a front surface of a housing.

Furthermore, in the terminal device 100, a fingerprint reader 170 and a power button 141 are disposed on a side surface 100S of the housing. The power button 141 is disposed below the fingerprint reader 170. When the fingerprint reader 170 is pressed, the power button 141 disposed below the fingerprint reader 170 is pressed, and the power of the terminal device 100 is turned on. Alternatively, the state of the terminal device 100 is switched from a sleep state to a state in which a lock screen is displayed on the display unit 120 by pressing the power button 141. Note that, on the lock screen, functions that a user can execute on the terminal device 100 are limited.

Furthermore, a user can perform a fingerprint image registration operation and a collation operation by bringing a finger into contact with the fingerprint reader 170 disposed on the power button 141. The operation of a finger for causing the fingerprint reader 170 to read a fingerprint can be divided into a touch operation and a push operation.

The touch operation is an operation in which a finger touches a detection surface of the fingerprint reader 170. In the touch operation, a force with which a finger presses the detection surface is weaker than the push operation as described later. In the touch operation, the fingerprint reader 170 reads a fingerprint image (hereinafter also referred to as a "fingerprint image") in a state where the power button 141 is not pressed. Registration of a fingerprint may be performed by the touch operation. Since it is easy for a user to operate the touch operation, the user can relatively easily perform the fingerprint registration process or the fingerprint authentication process a plurality of times. When a fingerprint is initially registered on the terminal device 100, there is a possibility that a user may register a fingerprint a plurality of times. Therefore, the user can perform fingerprint registration relatively easily by performing the fingerprint registration process by touch operation. Note that, in the fingerprint registration process, the features of a fingerprint image read by the touch operation are registered.

The push operation is an operation to press a detection surface of the fingerprint reader 170 in reading a fingerprint. In the push operation, the force with which a finger presses the detection surface is stronger than the force in the touch operation. In the push operation, the fingerprint reader 170 reads a fingerprint image in a state where the power button 141 is pressed by the fingerprint reader 170. In a case where the terminal device 100 is in a sleep state when fingerprint authentication is performed, the user cancels a sleep state and puts the terminal device 100 in a state where a fingerprint authentication process can be activated. In order to cancel this sleep state, the user presses the power button 141. For example, the user presses the power button 141 via the fingerprint reader 170 to start fingerprint authentication. As a result, the terminal device 100 is ready to start fingerprint authentication. Then, the authentication is performed by collating the feature of the fingerprint image read by the push operation with the feature of the registered fingerprint image.

As described above, in the terminal device 100 according to the present embodiment, turn-on of the power or the cancellation of a sleep state and the start of fingerprint authentication may be simultaneously performed by the push operation. Therefore, the user can perform, for example, the cancellation of a sleep state and the fingerprint authentication by one operation. Note that, the lock or sleep state of the terminal device 100 may be canceled by operating an operation key other than the power button 141. Furthermore, the power button 141 may not be disposed, and the fingerprint reader 170 may directly press the power switch.

Furthermore, on the bottom surface of the terminal device 100, a connection terminal 190 to which a cable is connected is disposed. A data communication cable for communicating data with an external device, or a power supply cable for supplying power may be connected to the connection terminal 190. Such a connection terminal 190 may be, for example, a USB port.

Note that, in FIG. 1, although a smart phone has been illustrated as an example of the terminal device 100, the terminal device 100 is not limited to a smart phone. For example, the terminal device 100 may be an information processing apparatus such as a personal computer (PC), a home video processor (DVD recorder, video deck, etc.), a personal digital assistants (PDA), a home gaming device, a home appliance, a mobile phone, a portable music playback device, a portable video processor, and a portable game apparatus.

2. FUNCTION OF TERMINAL DEVICE

Figure 2:
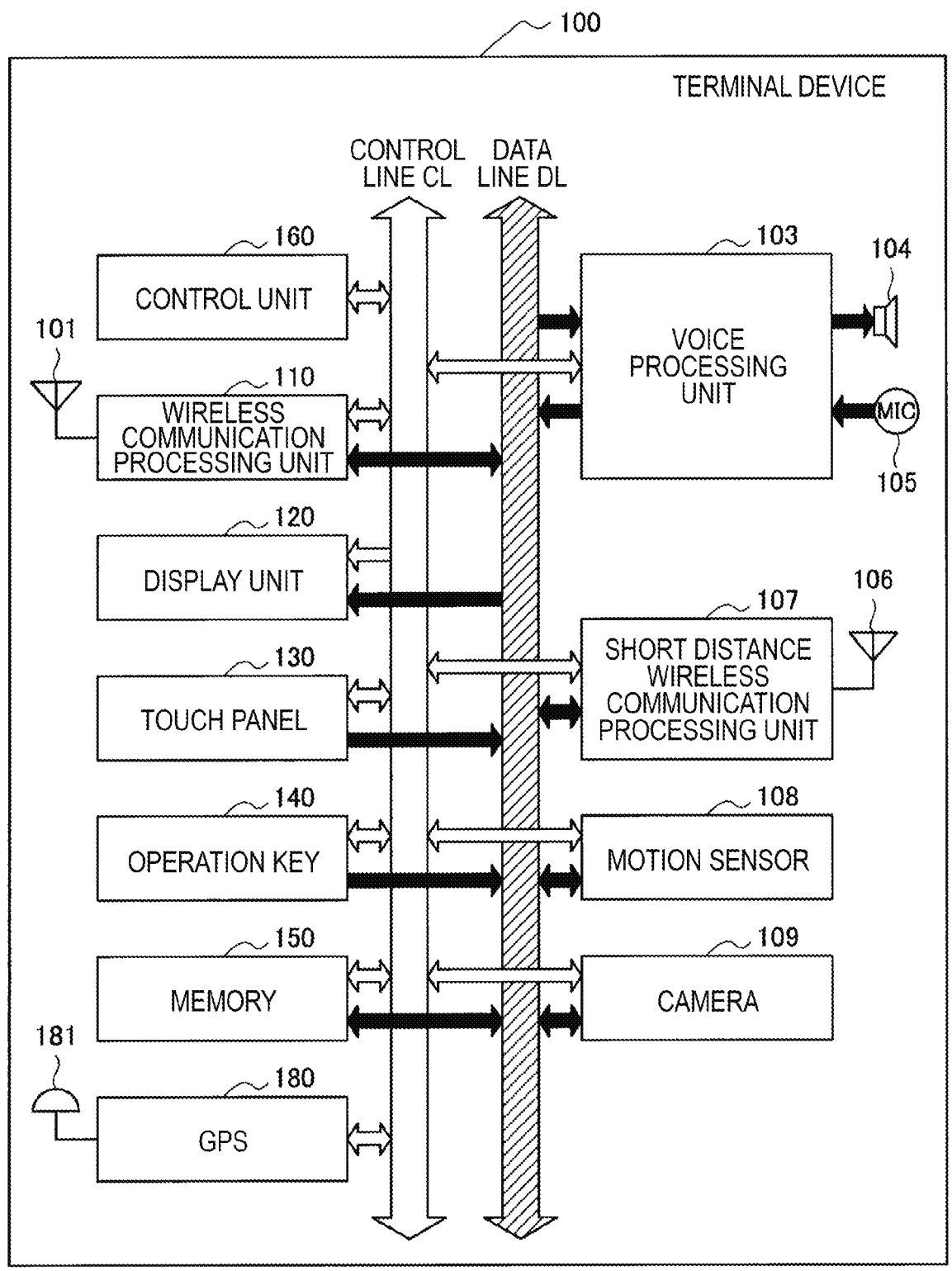
FIG. 2 is an explanatory view illustrating a functional configuration of the terminal device.

The appearance configuration of the terminal device 100 of the present disclosure has been described above. With reference to FIG. 2, functions of the terminal device 100 of the present disclosure will be described next.

FIG. 2 is an explanatory view illustrating a functional configuration of the terminal device 100. As illustrated in FIG. 2, the terminal device 100 includes a control unit 160, a wireless communication processing unit 110, a display unit 120, a touch panel 130, an operation key 140, a memory 150, and a GPS unit 180. The terminal device 100 further includes a voice processing unit 103, a speaker 104, a microphone 105, a short distance wireless communication processing unit 107, a motion sensor 108, a camera 109, and antennas 101, 106, and 181.

The control unit 160 transmits a control command to the wireless communication processing unit 110 via a control line CL. Furthermore, the control unit 160 also reads a program (software) stored in the memory 150 via the control line CL. Then, the control unit 160 controls each part of the terminal device 100 by executing the read program. The control unit 160 also executes a fingerprint authentication program stored in the memory 150 to perform fingerprint registration processing and authentication processing. The control unit 160 may have functions of a feature extraction unit that extracts features of a fingerprint and a collating unit that performs collating of the fingerprint. The control unit 160 includes, for example, a central processing unit (CPU). Note that, the control unit 160 may have a function of a detection unit that detects that authentication processing has been started. Furthermore, the control unit 160 may have a function of a display control unit for displaying a lock screen, an authentication processing screen, and a home screen as described later. Display elements generated by the display control unit include a UI used for operation, a character string, an image (moving image, still image), a window, an icon, a background object, and the like.

The wireless communication processing unit 110 performs processing of transmission and reception of a wireless signal under the control of the control unit 160. Furthermore, the terminal device 100 further includes the antenna 101 for performing wireless communication with a base station, and the antenna 101 is connected to the wireless communication processing unit 110.

In addition, in a case where the terminal device 100 performs data communication or mail transmission/reception via a network such as the Internet, the wireless communication processing unit 110 may perform transmission/reception processing under the control of the control unit 160. For example, the data received by the wireless communication processing unit 110 is stored in the memory 150, and the control of the control unit 160 performs processing such as display based on the stored data. Furthermore, the data stored in the memory 150 is supplied to the wireless communication processing unit 110 and transmitted wirelessly.

The memory 150 stores data prepared in advance, such as a program, and stores data generated by a user operation. Storage of data in the memory 150 and reading of data from the memory 150 are performed under the control of the control unit 160.

The voice processing unit 103 demodulates supplied voice data to obtain an analog voice signal. The voice data supplied to the voice processing unit 103 may be voice data for a call received by the wireless communication processing unit 110. At this time, the wireless communication processing unit 110 supplies voice data to the voice processing unit 103 via a data line DL. The analog voice signal obtained by the voice processing unit 103 is supplied to the speaker 104, and voice is output from the speaker 104.

Furthermore, the voice processing unit 103 converts a voice signal output from the microphone 105 into voice data of a transmission format. Then, the voice data converted by the voice processing unit 103 is supplied to the wireless communication processing unit 110 via the data line DL. Furthermore, the voice data supplied to the wireless communication processing unit 110 is packetized and wirelessly transmitted.

Note that, in a case where the terminal device 100 does not have a voice call function, the voice processing unit 103, the speaker 104, and the microphone 105 may be omitted.

The display unit 120 displays various display screens such as a lock screen, an authentication processing screen, and a home screen on the display panel under the control of the control unit 160. As the display panel, for example, a liquid crystal display panel or an organic electro-luminescence (EL) display panel is used.

The touch panel 130 detects a touched position when the surface (detection surface) of the display panel is touched with an object such as a finger or a pen. For example, the touch panel 130 detects that a finger or a pen has contacted with an area or the like in which the display panel displays an image or the like. Note that, the touch panel 130 may be stacked on the display panel or may be integrated with the display panel. The touch panel 130 may be, for example, a capacitance type. In this case, the touch panel 130 detects that the surface of the display panel is touched with a finger or the like from a change in capacitance.

Data on the touch position detected by the touch panel 130 is transmitted to the control unit 160. The control unit 160 executes an application being activated on the basis of the supplied touch position. The touch position is indicated by coordinate positions of, for example, an X axis (horizontal axis) and a Y axis (vertical axis) which are two orthogonal axes. The coordinate position detected by the touch panel 130 is not limited to one point. In a case where a plurality of points is simultaneously touched, the control unit 160 performs control based on a plurality of the points detected. Furthermore, when a wide range of the touch panel 130 is touched simultaneously, the control unit 160 detects the entire touched range.

Furthermore, the terminal device 100 further includes the operation key 140 such as a power switch 142. Operation information of the operation key 140 is transmitted to the control unit 160. As described above, the surface of the operation key 140 may be provided with a fingerprint reader 170 that reads the surface (fingerprint) of a placed finger. The fingerprint reader 170 may read a fingerprint of a finger having touched the detection surface disposed on its surface and may send the read image to the control unit 160. Further, the fingerprint reader 170 stores the read image in the memory 150. The fingerprint reader 170 includes a plurality of sensor elements disposed in a two-dimensional array. For the fingerprint reader 170, for example, an optical method, an electric field strength measurement method, a capacitance method, or the like is used.

The GPS unit 180 acquires the position of the terminal device 100 by performing triangulation on the basis of information included in radio waves received from satellites. The GPS unit 180 is connected to an antenna 181 for receiving radio waves from satellites.

The short distance wireless communication processing unit 107 is used to perform short distance wireless communication with another terminal. The short distance wireless communication method may be, for example, Wi-Fi, Bluetooth (registered trademark), or Zigbee (registered trademark). The short distance wireless communication processing unit 107 is connected to the antenna 106 for transmitting radio waves to another terminal or receiving radio waves from another terminal.

The motion sensor 108 is used to detect the movement or attitude of the terminal device 100. The motion sensor 108 may detect the acceleration of the terminal device 100 by, for example, an acceleration sensor. The motion sensor 108 may also detect angular acceleration or angular velocity of the terminal device 100 by a gyro sensor. Furthermore, the camera 109 is also used to capture an image.

Note that, the terminal device 100 includes a power supply unit (battery) not illustrated. Each block in the terminal device 100 is driven by the power supplied from the power supply unit.

3. SPECIFIC EXAMPLE OF DISPLAY CONTROL

The functions of the terminal device 100 of the present disclosure have been described above. Among the above-described functions, the embodiment of the present disclosure particularly relates to a display screen generation function by the control unit 160. Then, the display screen generation function by the control unit 160 will be more specifically described below.

(3-1. Concept)

The terminal device 100 of the present disclosure displays a display screen including a background object having motion. The terminal device 100 changes a position, shape, size, color or the like of the background object according to a state change of the terminal device 100. For example, the terminal device 100 moves the background object to a position corresponding to the configuration related to a state of the terminal device 100. With this configuration, a user can indirectly recognize a state of the terminal device 100 by viewing the background object. Hereinafter, several specific examples of the display screen including such a background object will be sequentially described.

(3-2. Authentication Process Screen to Home Screen)

Figure 3:
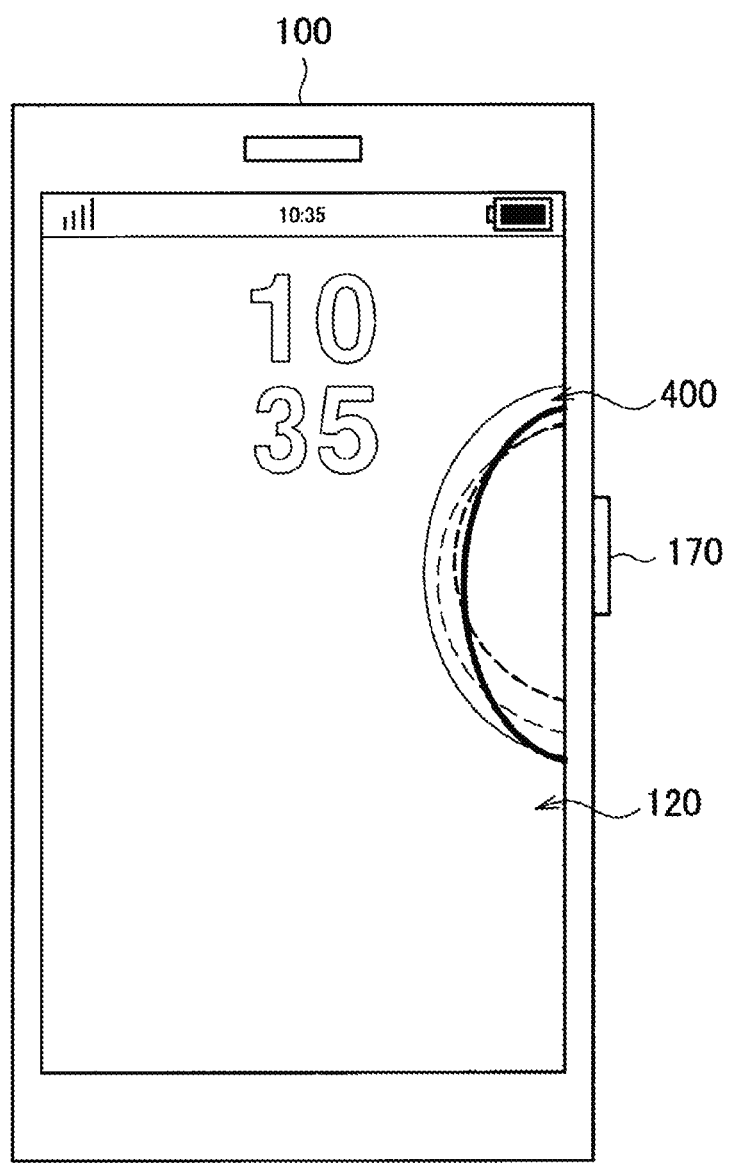
FIG. 3 is an explanatory view illustrating an authentication processing screen displayed during fingerprint authentication.

FIG. 3 is an explanatory view illustrating an authentication processing screen displayed during fingerprint authentication. When the user's finger contacts a detection surface of the fingerprint reader 170, fingerprint authentication is started, and the control unit 160 causes the display unit 120 to display an authentication processing screen illustrated in FIG. 3.

As illustrated in FIG. 3, the authentication processing screen includes a loop object 400 which is an example of a background object. The loop object 400 includes two or more curved objects overlapping each other. Each of the two or more curved objects has a ring shape (loop shape), and approximately half of each curved object is illustrated in FIG. 3.

The control unit 160 disposes the loop object 400 at a position corresponding to the configuration related to a state of the terminal device 100. Since the fingerprint reader 170 relates to the state in which the authentication process is being performed, while the authentication processing is being performed, the control unit 160 disposes the loop object 400 close to the position of the fingerprint reader 170 as illustrated in FIG. 3. The user can indirectly grasp that the authentication process is being performed because the loop object 400 is disposed close to the fingerprint reader 170.

Note that each curved object forming the loop object 400 may have a different color. Furthermore, the same curved object may have different colors depending on the position. In FIG. 3 and the subsequent drawings, the color possessed by each curved object is expressed by a line type such as a solid line or a broken line.

Figure 4:
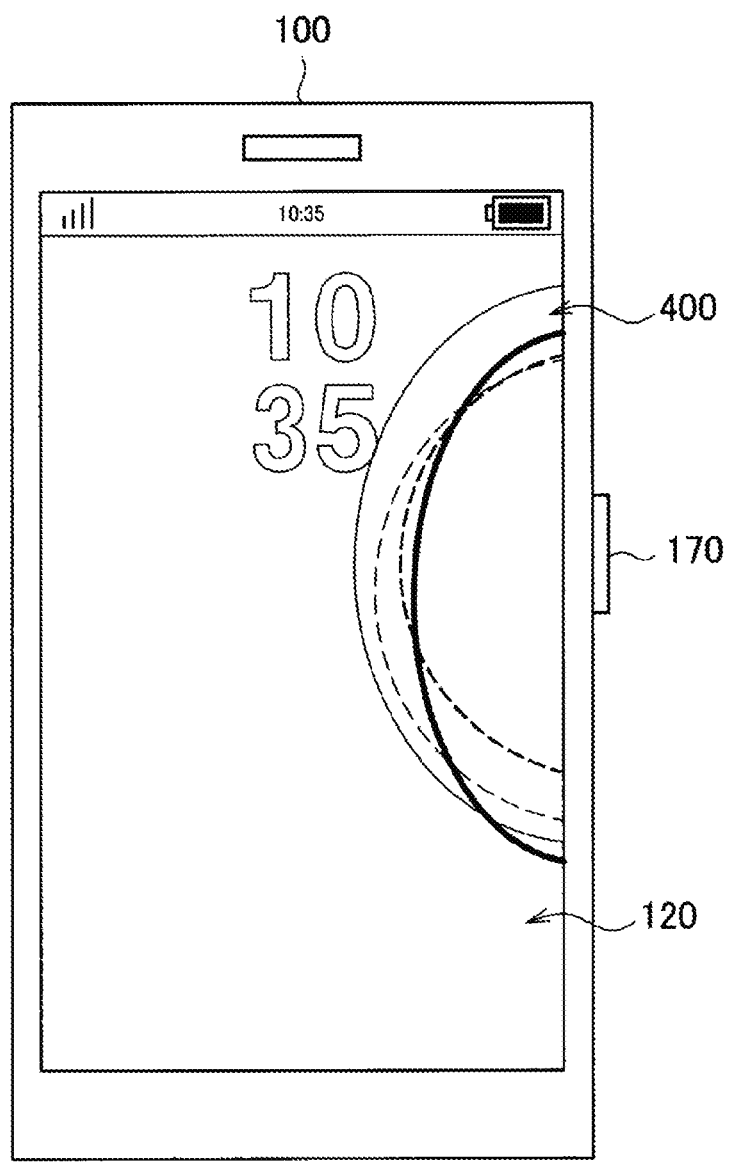
FIG. 4 is an explanatory view illustrating an authentication processing screen displayed during fingerprint authentication.

The loop object 400 described above gradually increases in size as illustrated in FIG. 4 as time passes from the start of the authentication process. Then, when the authentication process is successful, the control unit 160 causes the display unit 120 to display a home screen. Note that, in a case where the authentication process fails, the control unit 160 may distort the loop object 400 as a whole. Moreover, in a case where a user tries the authentication process again, and the authentication process fails again, the loop object 400 whose shape is distorted by the first authentication process may be further deformed. In the deformation, the degree of distortion may be increased such that the state after the first failure and the state after the second failure can be distinguished, or the shape of the loop object 400 may be changed while being distorted as a whole.

Figure 5:
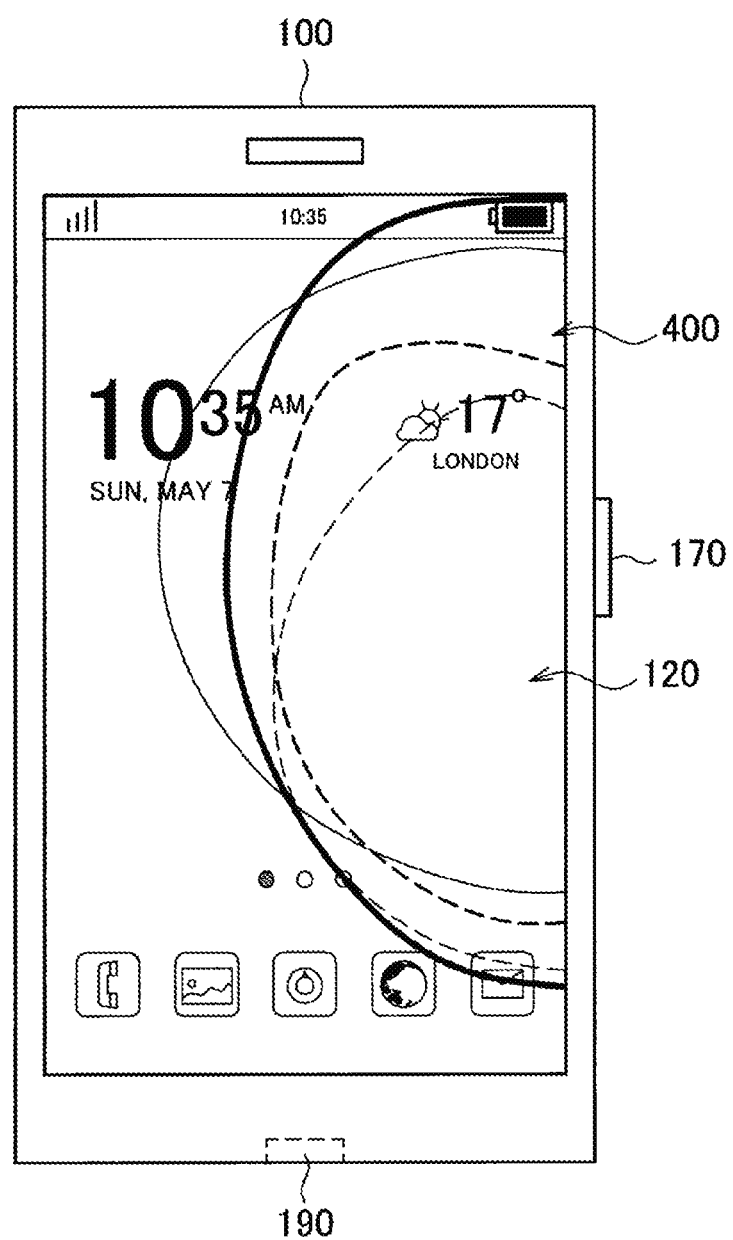
FIG. 5 is an explanatory view illustrating a home screen.

FIG. 5 is an explanatory view illustrating a home screen. As illustrated in FIG. 5, the home screen is an application selection screen that includes icons of one or more applications. On the home screen also, as illustrated in FIG. 5, the loop object 400 is constantly included. The control unit 160 may change a shape, color, or size of the loop object 400 every moment. With this configuration, a user can feel that the terminal device 100 is operating as if the terminal device 100 is a living body. Note that FIG. 5 illustrates an example in which the loop object 400 is superimposed on the icon. Since the loop object 400 is a background object, basically, in the area where the icon is disposed, the loop object 400 is hidden behind the icon and cannot be seen, but in a case where the icon has transparency, as illustrated in FIG. 5, the loop object 400 may be superimposed on the icon. The subsequent drawings are similar to FIG. 5.

(3-3. Swipe Home Screen)

A home screen may include a plurality of pages. Each page contains a different icon. In a case where the home screen includes a plurality of pages, any one of the pages is displayed on the display unit 120 as the home screen. The control unit 160 can switch a page displayed as the home screen on the display unit 120 on the basis of, for example, a swipe operation by a user.

Figure 6:
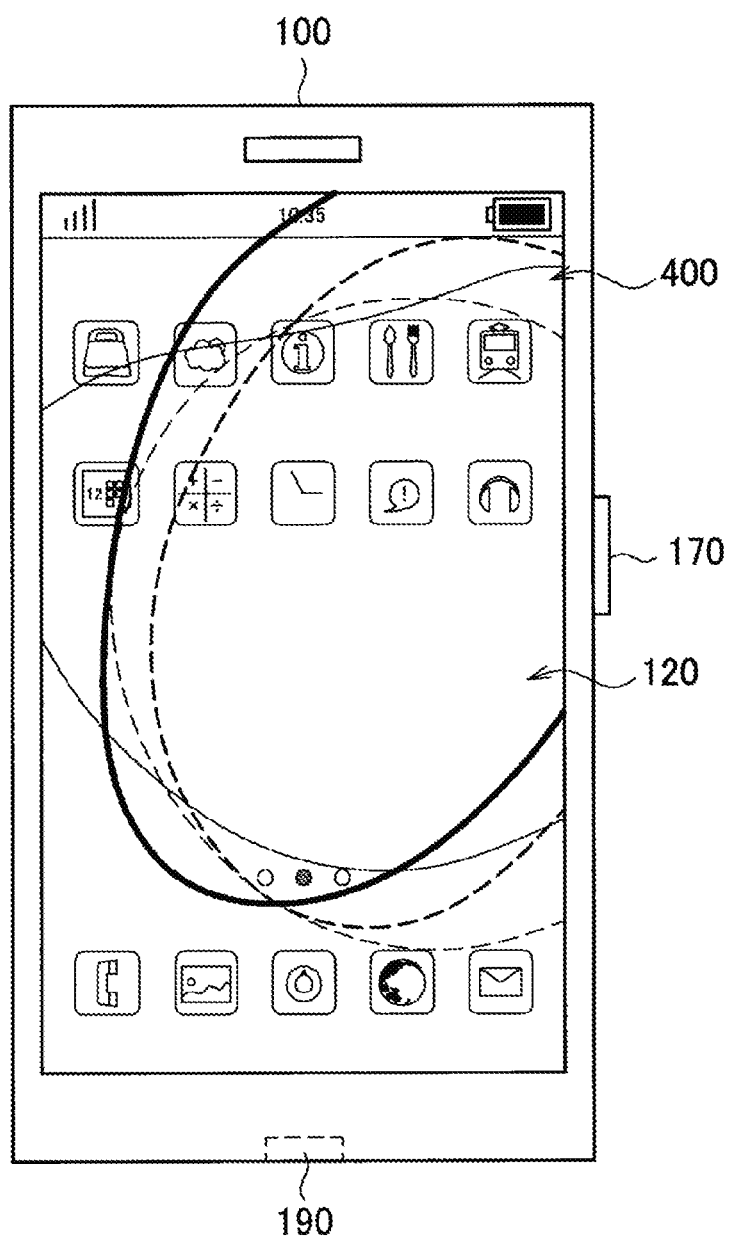
FIG. 6 is an explanatory view illustrating a home screen in which a page is switched by a swipe operation.

FIG. 6 is an explanatory view illustrating a home screen in which a page is switched by a swipe operation. As illustrated in FIG. 6, when the page on the home screen is switched, the displayed icon changes. Furthermore, as illustrated in FIG. 6, the control unit 160 changes the appearance of the loop object 400 along with switching of the page. For example, the control unit 160 may move the loop object 400 by the amount smaller than the page swipe amount in the same direction as a page swipe direction. According to such a configuration, a user can feel swipe like a viewpoint movement in a virtual space in which an icon and the loop object 400 are disposed. Furthermore, by making a movement amount of the loop object 400 smaller than a swipe amount of the page, it is possible to express a sense of depth and a three-dimensional effect of the loop object 400.

(3-4. Pop-Up Display)

A home screen may pop up information for assisting a user's operation, information for informing a user, or the like. In a state where such a pop-up display is included in the home screen, it is desirable for a user to pay attention to the pop-up display. Therefore, in the state where the pop-up display is included in the home screen, the terminal device 100 of the present disclosure disposes the loop object 400 at a position corresponding to the pop-up display.

Figure 7:
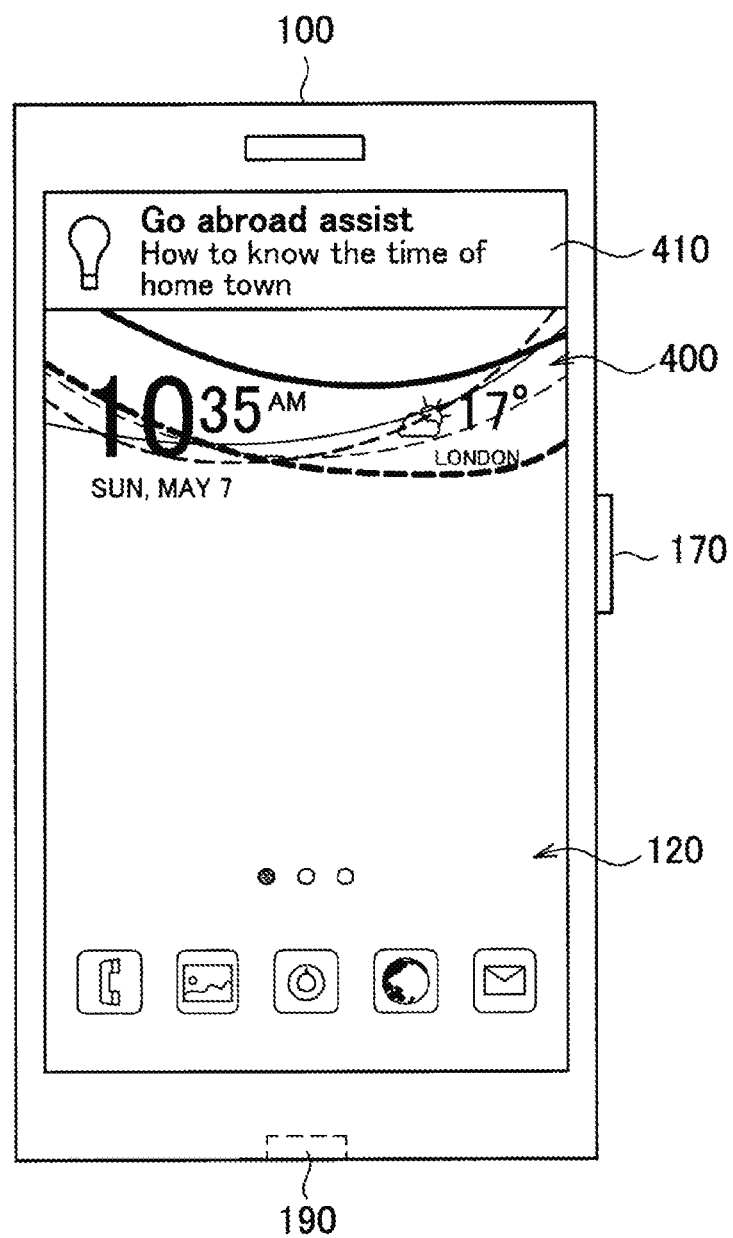
FIG. 7 is an explanatory view showing a home screen including a pop-up display.

FIG. 7 is an explanatory view illustrating the home screen including the pop-up display. As illustrated in FIG. 7, in a case where the pop-up display 410 is positioned at an upper end of the display unit 120, the control unit 160 disposes the loop object 400 close to the upper end of the display unit 120. With such a configuration, it is expected that the user's attention is directed to the pop-up display 410 since the pop-up display 410 is closed up.

Note that, the control unit 160 may not cause the loop object 400 to react to all pop-up displays, and may cause the loop object 400 to react only to specific pop-up displays.

(3-5. Display Control According to Remaining Battery Capacity)

The control unit 160 changes the loop object 400 in accordance with a power state of the terminal device 100. Hereinafter, with reference to FIG. 8, a specific example of display control in a case where a remaining battery capacity of the terminal device 100 is less than a threshold will be described.

Figure 8:
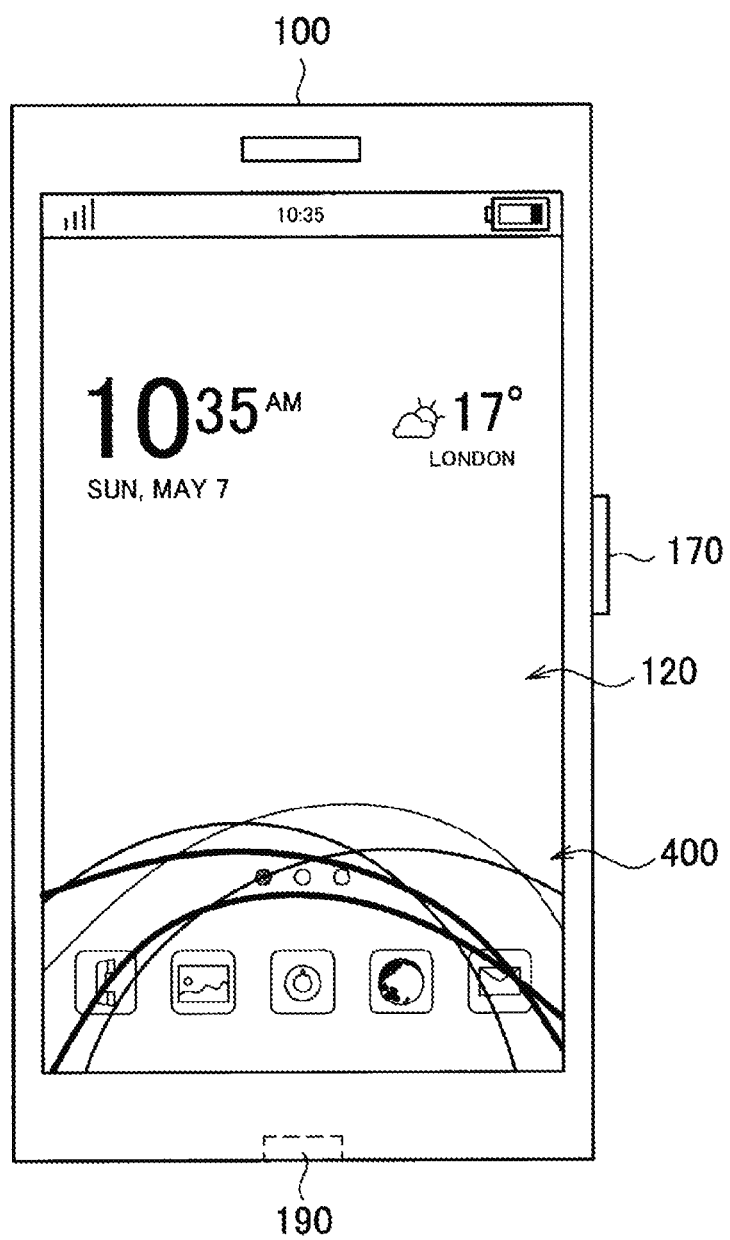
FIG. 8 is an explanatory view illustrating a home screen displayed in a case where a remaining battery capacity of the terminal device is less than a threshold.

FIG. 8 is an explanatory view illustrating a home screen displayed in a case where a remaining battery capacity of the terminal device 100 is less than a threshold. As illustrated in FIG. 8, in a case where the remaining battery capacity of the terminal device 100 is less than a threshold (for example, 15%), the control unit 160 moves the loop object 400 to the lower end side of the display unit 120. By disposing the loop object 400 on the lower end side of the display unit 120, a user can indirectly grasp that the remaining battery capacity is low.

Furthermore, since the connection terminal 190 for charging is provided on a lower end side of the display unit 120, it can be said that the loop object 400 is disposed close to a connection terminal related to a state where the battery residual amount of the terminal device 100 is low. With such a configuration, an effect of indirectly prompting a user to charge a battery via the connection terminal 190 is also expected.

Further, in FIG. 8, the loop object 400 has red color (a solid line expresses red color). Generally, red makes it easy for a user to recall a warning. By making the loop object 400 red in a case where the remaining battery capacity is low, it is possible to make a user strongly recognize the situation where the remaining battery capacity is low.

(3-6. Charge State)

Figure 9:
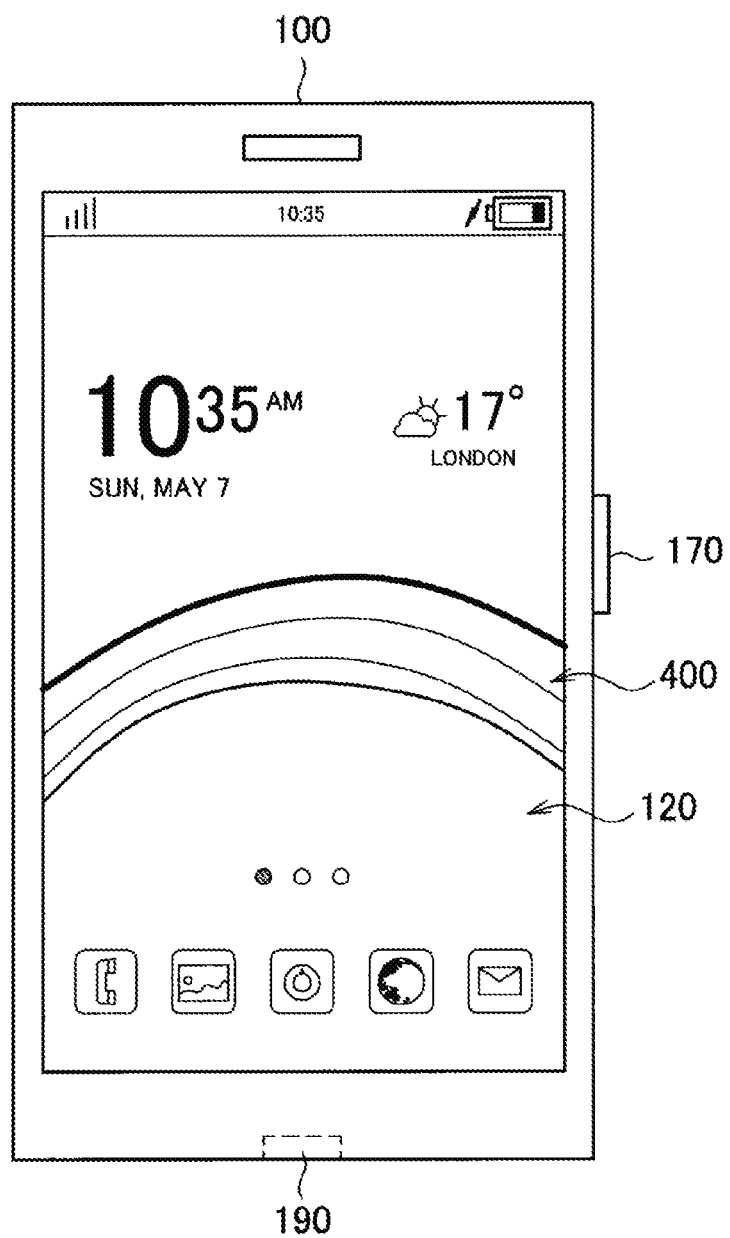
FIG. 9 is an explanatory view illustrating a home screen displayed in a case where a state of a terminal device is in a charging state.

When the state of the terminal device 100 is in a charging state in which a power supply cable is inserted into the connection terminal 190, the control unit 160 moves the loop object 400 to the arrangement illustrated in FIG. 9.

FIG. 9 is an explanatory view illustrating a home screen displayed in a case where the terminal device 100 is in a charging state. As illustrated in FIG. 9, in the charging state, the control unit 160 disposes the loop object 400 such that each curved object forming the loop object 400 forms a circular arc of a concentric circle centered on the vicinity of the connection terminal 190. According to the arrangement of the loop object 400, since it looks as if ripples are spreading from the connection terminal 190, it is possible for a user to indirectly grasp the charging state in which power is coming from the connection terminal 190.

Figure 10:
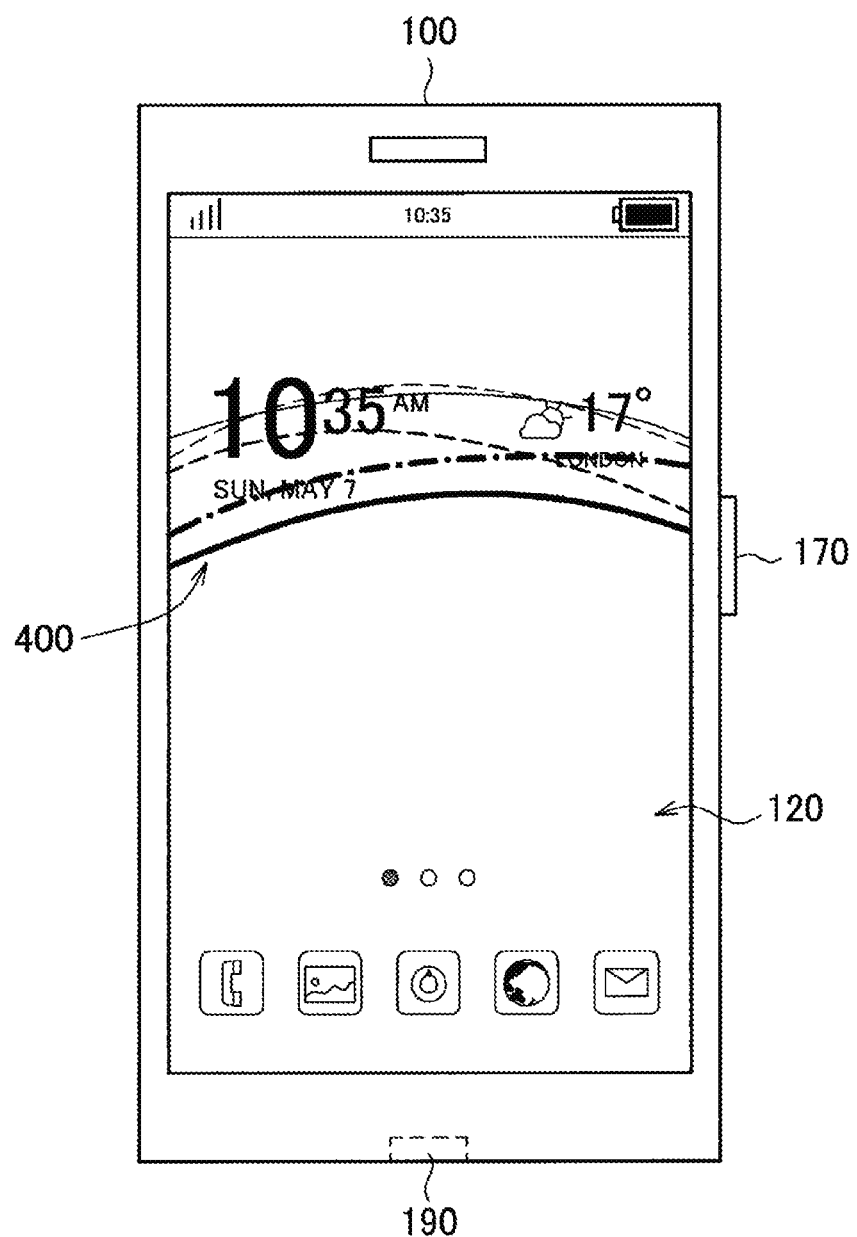
FIG. 10 is an explanatory view illustrating a home screen displayed in a case where a state of a terminal device is in a charging state.

Furthermore, as charging proceeds and the battery charge increases, as illustrated in FIG. 10, the control unit 160 lengthens a radial distance of each of the curved objects forming the loop object 400 and moves the loop object 400 to an upper side of the display unit 120. Furthermore, the control unit 160 causes the loop object 400 to increase colors other than red as charging proceeds and the battery charge increases. With this configuration, a user can grasp the remaining battery capacity from the position and color of the loop object 400 even in a charging state.

Note that, when the power supply cable is disconnected from the connection terminal 190, the control unit 160 moves the loop object 400 to a neutral position.

Figure 11:
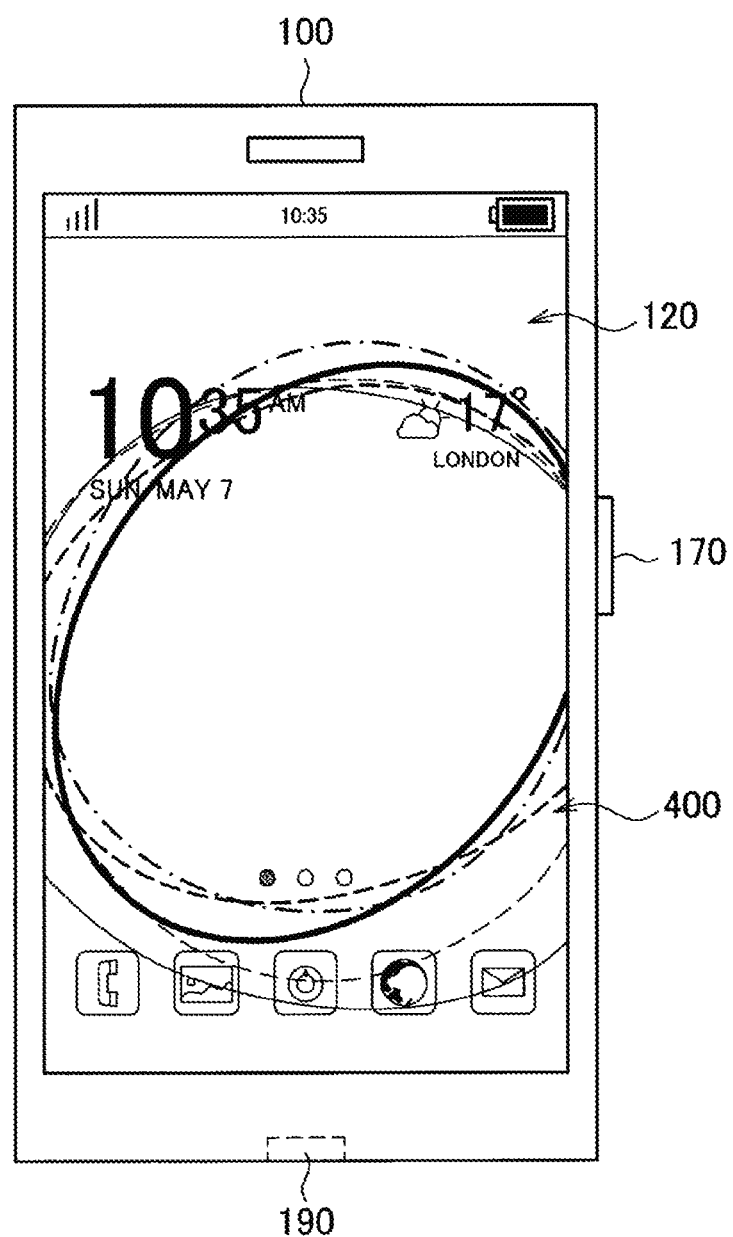
FIG. 11 is an explanatory view illustrating a loop object moved to a neutral position.

FIG. 11 is an explanatory view illustrating the loop object 400 moved to a neutral position. As illustrated in FIG. 11, the neutral position of the loop object 400 may be a position that surrounds the center of the display unit 120. According to such a configuration, it is possible to provide a user with a feeling as if the force acting on the loop object 400 by the connection of the power supply cable has been released.

(3-7. Icon Emphasizing)

In a case where there is an application to be focused on in the terminal device 100, the control unit 160 disposes the loop object 400 so as to surround the icon corresponding to the application.

Figure 12:
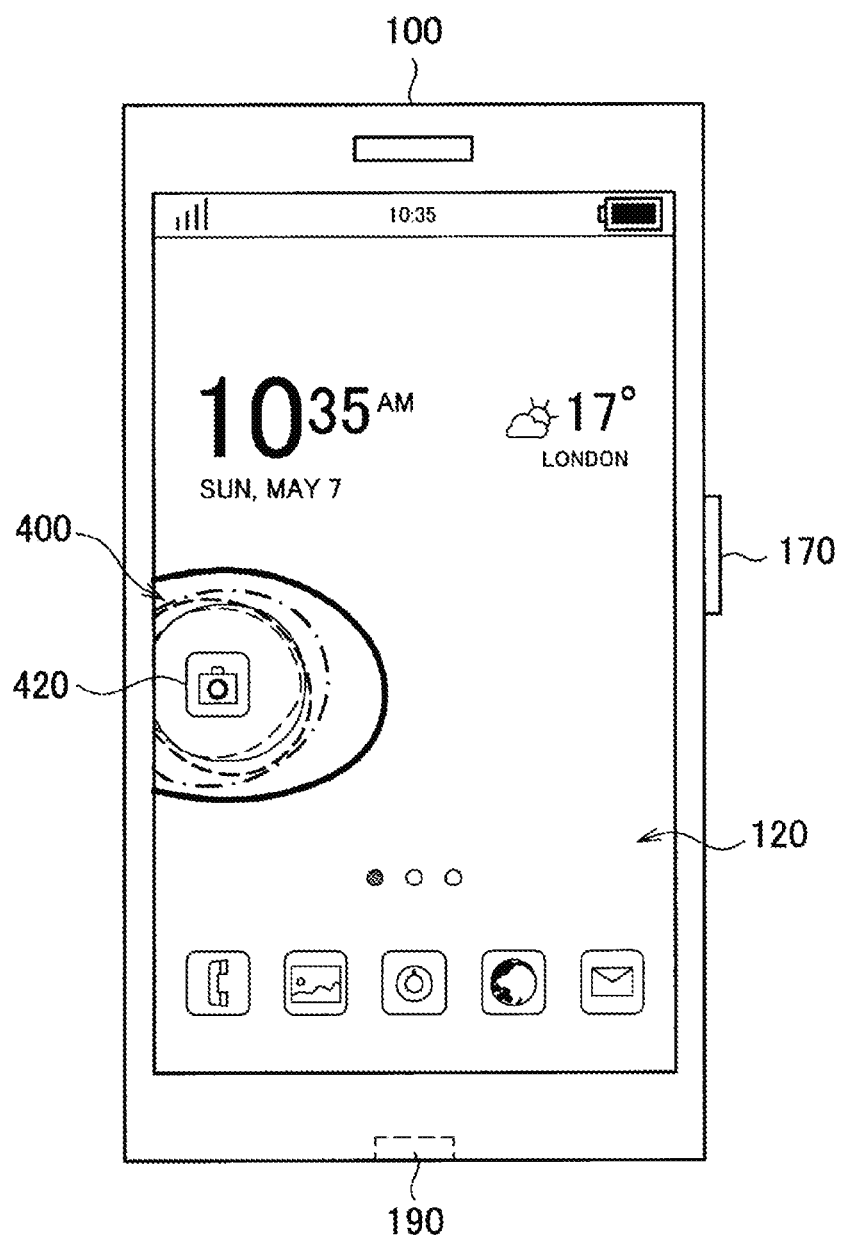
FIG. 12 is an explanatory view illustrating an arrangement example of an icon of a loop object.

FIG. 12 is an explanatory view illustrating an arrangement example of an icon of the loop object 400. In a case where an icon 420 illustrated in FIG. 12 is the icon of the application to be focused on, the control unit 160 disposes the loop object 400 so as to surround the icon 420. With such a configuration, it is expected that the user's attention is directed to the icon 420.

Note that, the application to be focused on may be an application that satisfies predetermined conditions. The predetermined conditions include an application whose icon is displayed on the home screen for the first time after installation, an application whose icon is displayed on the home screen for the first time after being updated, an application in which a specific event occurs in the application, and the like.

(3-8. Supplement)

As described above, a position of the loop object 400 changes with a state change of the terminal device 100. The position change of the loop object 400 is not performed at an instantaneous switching, but is performed with an animation. For example, the change from the position of the loop object 400 on the home screen illustrated in FIG. 5 to the position of the loop object 400 on the charging screen illustrated in FIG. 9 is realized by continuous movement.

Furthermore, the position of the loop object 400 may change on the basis of an element other than the state of the terminal device 100. For example, in a case where the user taps the display unit 120, the control unit 160 may move the loop object 400 to the tapped position, or the spread of ripples due to tapping may be expressed by fluctuation of the loop object 400.

4. OPERATION OF TERMINAL DEVICE

The configuration of the terminal device 100 according to the embodiment of the present disclosure has been described above. Next, with reference to FIG. 13, an operation of the terminal device 100 by the embodiment of the present disclosure will be arranged.

Figure 13:
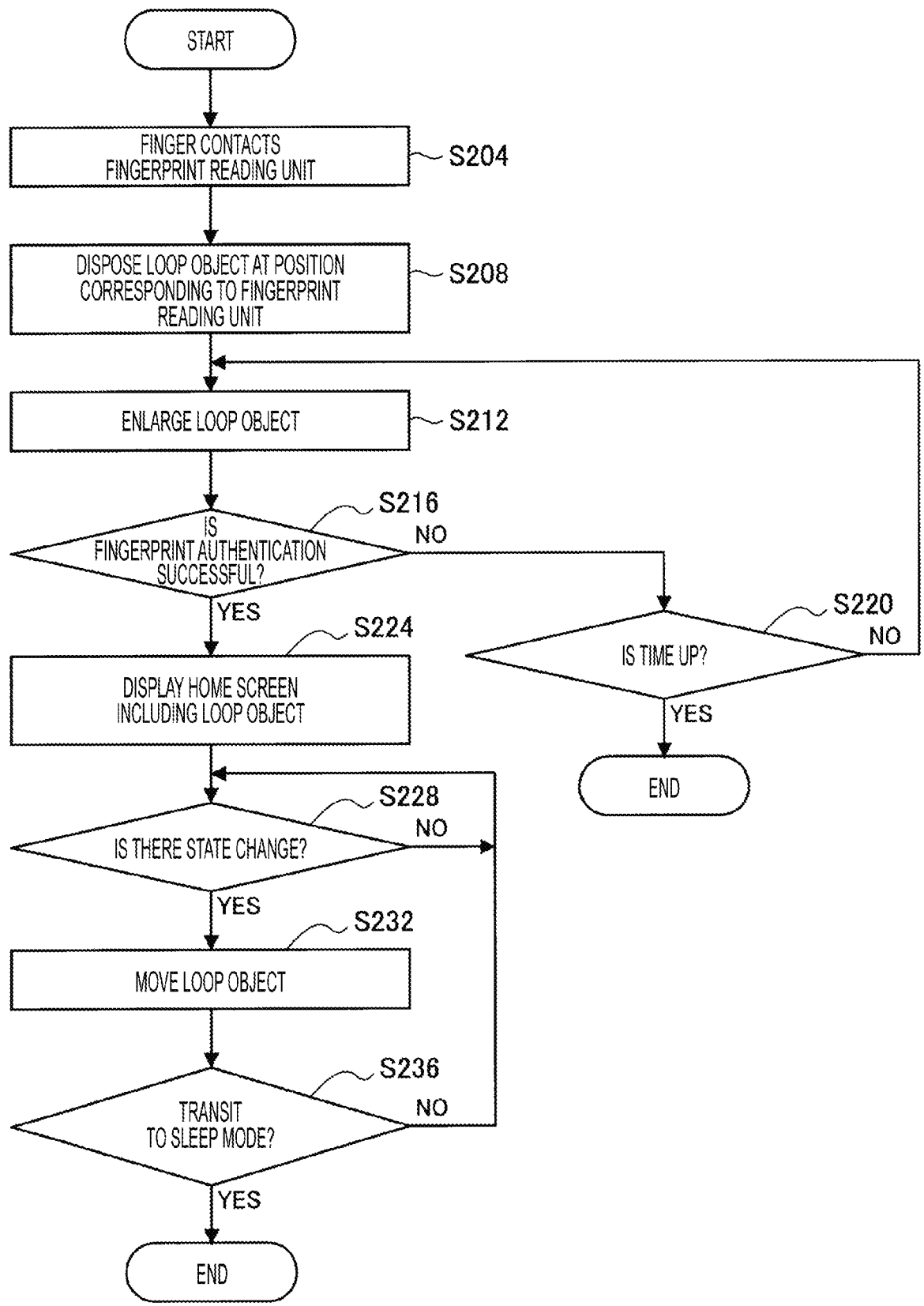
FIG. 13 is a flowchart indicating an operation of the terminal device according to an embodiment of the present disclosure.

FIG. 13 is a flowchart indicating an operation of the terminal device 100 according to the embodiment of the present disclosure. First, as illustrated in FIG. 13, when a user's finger contacts the fingerprint reader 170 (S204), fingerprint authentication is started, and the control unit 160 disposes the loop object 400 at a position corresponding to the fingerprint reader 170 (S208). Thereafter, the control unit 160 gradually enlarges the loop object 400 (S212) while the authentication process is not successful (S216/No) and has not yet timed out (S220/No). In a case where the fingerprint authentication has timed out (S220/Yes), the operation ends.

On the other hand, in a case where the fingerprint authentication is successful (S216/Yes), the control unit 160 causes the display unit 120 to display a home screen including the loop object 400 (S224).

Thereafter, the control unit 160 moves the loop object 400 according to a state change of the terminal device 100 (S228, S232). Then, the processes of S228 and S232 are repeated until the terminal device 100 transitions to a sleep mode (S236/No), and the operation ends with the transition of the terminal device 100 to a sleep mode (S236/Yes).

5. CONCLUSION

As described above, according to the embodiment of the present disclosure, the position, shape, size, color, or the like of the background object (loop object) changes according to a state change of the terminal device 100. With this configuration, a user can indirectly recognize a state of the terminal device 100 by viewing the background object.

Note that, although the preferred embodiments of the present disclosure have been described in detail with reference to the attached drawings, the technical scope of the present disclosure is not limited to such examples. It is obvious that persons having general knowledge in the technical field of the present disclosure can conceive various variations or modifications within the scope of the technical idea described in the claims, and these are naturally understood to belong to the technical scope of the present disclosure.

For example, although the loop object 400 has been described above as an example of the background object, the background object is not limited to the loop object 400. For example, the background object may be a band-like object having a twist, a single curved object, or an object having a square shape such as a quadrangle or a triangle.

Furthermore, although the example in which the loop object 400 is mainly displayed on the home screen has been described above, the loop object 400 may be displayed on another screen. For example, the loop object 400 may also be displayed on the lock screen. According to such a configuration, a user can indirectly grasp a state of the terminal device 100 without canceling the lock state by viewing the loop object 400 on the lock screen.

Furthermore, each step in the process of the terminal device 100 in the present specification does not necessarily have to be processed chronologically in the order described as the flowchart. For example, each step in the process of the terminal device 100 may be processed in an order different from the order described as the flowchart or may be processed in parallel.

Furthermore, it is possible to create a computer program for causing hardware such as a CPU, a ROM, and a RAM incorporated in the terminal device 100 to exhibit the same function as each configuration of the terminal device 100 described above. Furthermore, a storage medium storing the computer program is provided.

Furthermore, the effects described in the present specification are merely illustrative or exemplary and by no means limiting. That is, the technique according to the present disclosure can exhibit other effects obvious to those skilled in the art from the description of the present specification together with or instead of the above-described effects.

Furthermore, the following configurations also belong to the technical scope of the present disclosure.

(1)

An information processing apparatus, including a display control unit that generates a display screen including a background object, in which the display control unit moves a background object in accordance with a state change of the information processing apparatus.

(2)

The information processing apparatus according to (1), in which the background object includes one or more curved objects.

(3)

The information processing apparatus according to (1) or (2), in which the display control unit disposes the background object at a position corresponding to a configuration related to a state of the information processing apparatus among configurations of the information processing apparatus.

(4)

The information processing apparatus according to (3), further including a fingerprint reader for fingerprint authentication, in which the display control unit disposes the background object at a position corresponding to the fingerprint reader in a case where the fingerprint authentication is performed in the information processing apparatus and after the fingerprint authentication is performed.

(5)

The information processing apparatus according to (3) or (4), further including a connection terminal to which a cable is connected, in which the display control unit disposes the background object at a position corresponding to the connection terminal in a case where the cable is connected to the connection terminal.

(6)

The information processing apparatus according to (5), in which the display control unit moves the background object to a neutral position in a case where the cable is disconnected from the connection terminal.

(7)

The information processing apparatus according to (5) or (6), in which the cable connected to the connection terminal includes a power supply cable, and the display control unit brings the background object close to the connection terminal in accordance with a decrease in a remaining battery capacity of the information processing apparatus.

(8)

The information processing apparatus according to (1) to (7), in which, in a case where the display screen includes a pop-up display, the display control unit disposes the background object at a position corresponding to the pop-up display.

(9)

The information processing apparatus according to any one of (1) to (8), in which the display screen is an application selection screen including one or more application icons, and the display control unit changes an icon included in the selection screen in response to a swipe operation and changes an appearance of the background object in response to the swipe operation.

(10)

The information processing apparatus according to (9), in which the display control unit disposes the background object so as to surround an icon of an application that satisfies a predetermined condition.

(11)

The information processing apparatus according to any one of (1) to (10), in which the display control unit further changes at least one of a shape, a size, or a color of the background object in accordance with a state change of the information processing apparatus.

(12)

The information processing apparatus according to (11), in which the display control unit makes the background object close to a red color in accordance with a decrease in a remaining battery capacity of the information processing apparatus.

(13)

A method to be performed by an information processing apparatus, including:

generating a display screen including a background object by a processor; and moving the background object in accordance with a state change of the information processing apparatus.

(14)

A program for causing a computer to function as an information processing apparatus including a display control unit that generates a display screen including a background object, the display control unit moving the background object in accordance with a state change of the information processing apparatus.

REFERENCE SIGNS LIST

100 Terminal device
101 Antenna
103 Voice processing unit
104 Speaker
105 Microphone
106 Antenna
107 Short distance wireless communication processing unit
108 Motion sensor
109 Camera
110 Wireless communication processing unit
120 Display unit
130 Touch panel
140 Operation key 141 Power button
142 Power switch
150 Memory
160 Control unit
170 Fingerprint reader
171 Detection surface
180 GPS unit
181 Antenna
190 Connecting terminal

The invention claimed is:

1. An information processing apparatus, comprising
a display control unit configured to generate a display screen including a background object, wherein the display control unit moves the background object in accordance with a state change of the information processing apparatus; and
a connection terminal to which a cable is connected, wherein the display control unit disposes the background object at a position corresponding to the connection terminal in a case where the cable is connected to the connection terminal.

2. The information processing apparatus according to claim 1, wherein the background object includes one or more curved objects.

3. The information processing apparatus according to claim 1, wherein the display control unit disposes the background object at a position corresponding to a configuration related to a state of the information processing apparatus among configurations of the information processing apparatus.

4. The information processing apparatus according to claim 3, further comprising
a fingerprint reader for fingerprint authentication,
wherein the display control unit disposes the background object at a position corresponding to the fingerprint reader in a case where the fingerprint authentication is performed in the information processing apparatus and after the fingerprint authentication is performed.

5. The information processing apparatus according to claim 1, wherein the display control unit moves the background object to a neutral position in a case where the cable is disconnected from the connection terminal.

6. The information processing apparatus according to claim 1,
wherein the cable connected to the connection terminal includes a power supply cable, and
the display control unit brings the background object to a same side of the display screen as the connection terminal in accordance with a decrease in a remaining battery capacity of the information processing apparatus.

7. The information processing apparatus according to claim 1, wherein in a case where the display screen includes a pop-up display, the display control unit disposes the background object at a position corresponding to the pop-up display.

8. The information processing apparatus according to claim 1,
wherein the display screen is an application selection screen including one or more application icons, and
the display control unit changes an icon included in the selection screen in response to a swipe operation and changes an appearance of the background object in response to the swipe operation.

9. The information processing apparatus according to claim 8, wherein the display control unit disposes the background object so as to surround an icon of an application that satisfies a predetermined condition.

10. The information processing apparatus according to claim 1, wherein the display control unit further changes at least one of a shape, a size, or a color of the background object in accordance with a state change of the information processing apparatus.

11. The information processing apparatus according to claim 10, wherein the display control unit makes the background object a red color in accordance with a decrease in a remaining battery capacity of the information processing apparatus.

12. A method to be performed by an information processing apparatus, comprising:
generating a display screen including a background object by a processor;
moving the background object in accordance with a state change of the information processing apparatus; and
disposing the background object at a position corresponding to a connection terminal in a case where a cable is connected to the connection terminal.

13. A non-transitory computer readable medium storing a program for causing a computer to function as an information processing apparatus including:
a display control unit configured to generate a display screen including a background object, the display control unit moving the background object in accordance with a state change of the information processing apparatus,
wherein the display control unit disposes the background object at a position corresponding to a connection terminal in a case where a cable is connected to the connection terminal.

* * * * *